(12) United States Patent
Kumar et al.

(10) Patent No.: US 10,231,313 B2
(45) Date of Patent: Mar. 12, 2019

(54) SYSTEM AND METHOD FOR IMPROVING OCCUPANCY DETERMINATION

(71) Applicant: PHILIPS LIGHTING HOLDING B.V., Eindhoven (NL)

(72) Inventors: Rohit Kumar, Hackensack, NJ (US); Maulin Dahyabhai Patel, Tuckahoe, NY (US)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 203 days.

(21) Appl. No.: 15/128,419

(22) PCT Filed: Mar. 17, 2015

(86) PCT No.: PCT/IB2015/051926
§ 371 (c)(1),
(2) Date: Sep. 22, 2016

(87) PCT Pub. No.: WO2015/150945
PCT Pub. Date: Oct. 8, 2015

(65) Prior Publication Data
US 2018/0177025 A1    Jun. 21, 2018

Related U.S. Application Data

(60) Provisional application No. 61/972,691, filed on Mar. 31, 2014.

(51) Int. Cl.
*H05B 37/02* (2006.01)
*F21V 23/04* (2006.01)

(52) U.S. Cl.
CPC ..... *H05B 37/0227* (2013.01); *F21V 23/0471* (2013.01)

(58) Field of Classification Search
CPC ................. H05B 37/0227; F21V 23/0471
(Continued)

(56) References Cited

U.S. PATENT DOCUMENTS 5,489,827 A    2/1996  Xia
6,759,954 B1   7/2004  Myron et al.
(Continued)

FOREIGN PATENT DOCUMENTS

CN    101083054 A    12/2007
CN    201948606 U     8/2011
(Continued)

OTHER PUBLICATIONS

Bill Vonneida et al, "An analysis of the energy and cost savings potential of occupancy sensors for commercial lighting systems", Journal of Illuminating Engineering Society, 2001.
(Continued)

*Primary Examiner* — Daniel D Chang

(57) ABSTRACT

An apparatus, a system and a method for improving the determination of occupancy in an area is disclosed. The apparatus represents a motion sensor that provides improved granularity of the determination of motion within a first time period, wherein samples are collected during the first time period and then integrated over the first time period to determine a level of motion. The determined level of motion during the first time period are stored and transmitted at the end of a second time period. In one aspect of the invention, the occupancy is determined based on the collected level of motion inpreceding first time periods. In another aspect of the invention, the collected information is transmitted over a network, where the transmitted data may be further collected and processed.

11 Claims, 4 Drawing Sheets

(58) Field of Classification Search
USPC .......................................................... 315/297
See application file for complete search history.

(56) References Cited

U.S. PATENT DOCUMENTS

| | | |
|---|---|---|
| D656,849 S | 4/2012 | Ni et al. |
| D664,456 S | 7/2012 | Trine et al. |
| 2005/0111542 A1* | 5/2005 | Hattori ................. H04N 19/176 375/240.01 |
| 2010/0141425 A1 | 6/2010 | Tracey et al. |
| 2012/0044350 A1* | 2/2012 | Verfuerth ........... H05B 37/0272 348/143 |
| 2012/0296610 A1 | 11/2012 | Hailemariam et al. |

FOREIGN PATENT DOCUMENTS

| | | |
|---|---|---|
| KR | 100940543 B1 | 2/2010 |
| WO | 9625021 A1 | 8/1996 |
| WO | 2010029463 A1 | 3/2010 |

OTHER PUBLICATIONS

Galasiu, Anca D. et al, "Energy saving lighting control systems for open-plan offices: a field study", National Research Council Canada.

* cited by examiner

SYSTEM AND METHOD FOR IMPROVING OCCUPANCY DETERMINATION

CROSS-REFERENCE TO PRIOR APPLICATIONS

This application is the U.S. National Phase application under 35 U.S.C. § 371 of International Application No. PCT/IB2015/051926, filed on Mar. 17, 2015, which claims the benefit of U.S. Provisional Application No. 61/972,691, filed on Mar. 31, 2014. These applications are hereby incorporated by reference herein.

The present application relates to the field of occupancy sensors and, more particular, to an apparatus and method for improving occupancy determination and visualizing occupancy information in a building.

Occupancy sensors are sensing devices that are widely used in lighting control, HVAC, security and many other applications. A variety of occupancy sensors are commercially available. For example, Philips' OccuSwitch Sensors, Leviton's Universal Vacancy/Occupancy Sensors, Acuity's Sensor Switch, WattStopper's wall switch sensors, etc.). Occupancy sensing based lighting control systems have been shown to save 30% to 50% energy compared to manually-controlled lighting (see for example, Von Neida, "An Analysis of the Energy and Cost Savings Potential of Occupancy Sensors for Commercial Lighting Systems," Journal of Illuminating Engineering Society, 2001, pp. 11-125).

Recently adopted lighting codes and regulations have mandated occupancy sensing based lighting control system be incorporated into newer building constructions; thereby increasing the adoption of occupancy-sensing based lighting control systems in the market.

Occupancy or motion sensors typically use infrared (IR) or ultrasonic technology, or a combination of the two technologies. They switch between two discrete states; occupied and unoccupied. Whenever motion is detected, the motion sensor transitions to an occupied state, and electrical energy from a power source is provided to the lighting system. Conventionally, the motion sensor, used for occupancy sensing, when motion is sensed, the sensor further resets a timer to a pre-defined timeout interval (i.e., a reset time) and starts counting down the timeout interval. When the timer reaches zero, the sensor transitions to an unoccupied state, wherein the electrical energy is removed from the lighting system. In cases where the motion sensor is incorporated into a lighting system, the motion sensor may report its occupied/unoccupied state whenever a state change is detected. In addition, the occupancy state may also be reported periodically. The lighting system may be composed of a combination of wired and/or wireless networks that connects the occupancy sensors (and other devices) to a central station (i.e., a control center comprising a computer, memory, containing code, which provides instruction for the computer, and appropriate storage devices).

Generally, the reset time is long (e.g., 30 mins.) to prevent false negatives as the sensor sometimes fails to detect a person who is not moving (i.e., sitting on a desk). Therefore, when the motion sensor is in occupied state, the motion sensor will report "occupied" for the reset interval even if the space is physically vacant and there is no motion. This leads to a missed opportunity of using the motion sensor to extract a more granular motion profile.

For example, a scenario of motion and no-motion in a space such as motion for 5 mins,
no-motion for 15 mins,
motion for 1 min and
no-motion for 30 mins, causes a motion sensor with a timeout interval of 30 minutes to report an occupancy state for 51 minutes, even though the space was occupied for only 6 minutes.

From the above simple example, it can be deduced that the current behavior of motion sensors in reporting accurate occupancy information results in less than ideal occupancy information. This is mainly because the motion sensor reports occupancy states during the reset time following the end of motion detection even though the space is physically unoccupied.

Hence, there is a need in the industry for a system and method for improving the determination of occupancy using motion sensors and reporting this improved determination of an occupancy state.

It is an object of the present invention to provide an apparatus and method for providing an improved determination of occupancy.

It is a second object of the present invention to provide an apparatus and method for improving a granularity of determining occupancy.

It is another object of the present invention to provide a system incorporating an occupancy sensor to determine occupancy with improved granularity.

It is another object of the present invention to provide a system incorporating an occupancy sensor to provide improved granularity in managing lighting in a lighting system.

It is another object of the present invention to dynamically determine and adapt a behavior of motion sensors to report a more granular determination of motion within an area, sending data during emergency situations, reporting granular motion sensing data using a highly compact bit vector to avoid overwhelming a networking infrastructure and an intuitive color coded graphical visualization to present real-time motion sensing information.

For a better understanding of exemplary embodiments of the invention and to show how the invention may be carried into effect, reference is made to the accompanying drawings. It is stressed that the particulars shown are by way of example only and for purposes of illustrative discussion of the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings making apparent to those skilled in the art how the several forms of the invention may be embodied in practice. In the accompanying drawings:

It is noted that the drawings of the invention are not to scale. The drawings are intended to depict only typical aspects of the invention, and therefore should not be considered as limiting the scope of the invention. In the drawings, like numbers represent like elements between the drawings.

It is to be understood that the figures and descriptions of the present invention described herein have been simplified to illustrate the elements that are relevant for a clear understanding of the present invention, while eliminating, for purposes of clarity many other elements. However, because these omitted elements are well-known in the art, and because they do not facilitate a better understanding of the present invention, a discussion of such element is not provided herein. The disclosure herein is directed to also variations and modifications known to those skilled in the art.

Figure 1:
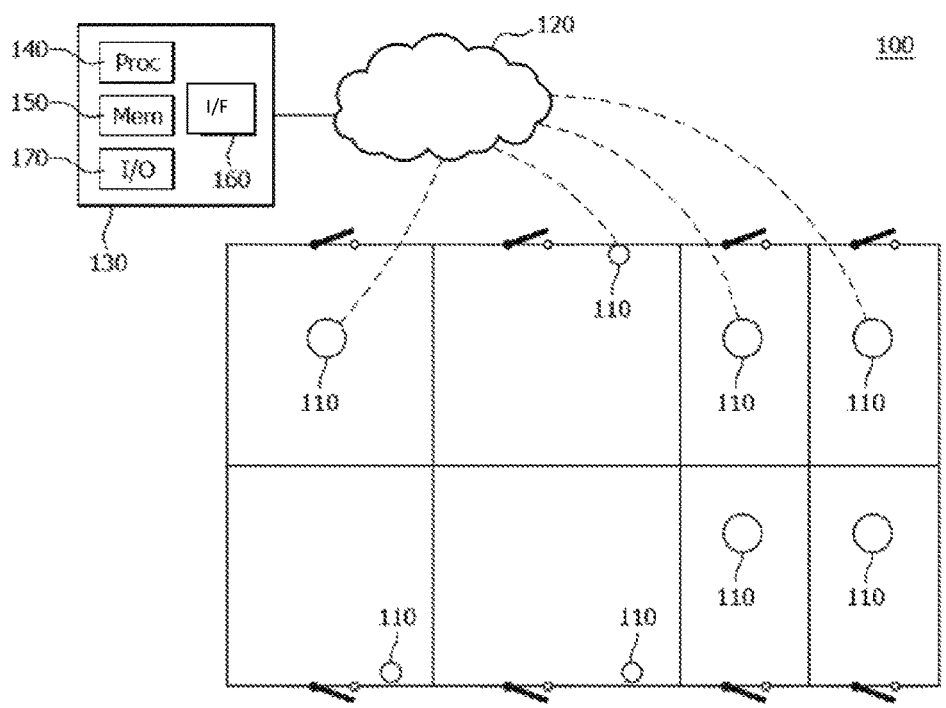
FIG. 1 illustrates an exemplary system in accordance with the principles of the invention.

FIG. 1 illustrates an exemplary lighting system 100 incorporating at least one motion sensor 110 used for determining occupancy within an area in accordance with the principles of the invention.

The system of FIG. 1 illustrates a conventional floor plan including a number of rooms or areas that are controlled by a lighting system 100. Each area includes at least one motion sensor 110 in communication, via network 120, to a central processing station 130. The central processing station 130 includes at least one processor 140 (i.e., computer system), a memory 150, an interface 160 to network 120, and an input/output device 170, that allows a user to input data into processor 140 or receive information (audio, visual, textual, etc.) from the processor 140.

The motion sensor 110 may be incorporated into a lighting fixture, which may be centered in the area. Alternatively, the motion sensor 110 may be incorporated into a light switch that is wall mounted near a door. Alternatively, the motion sensor 110 may be a standalone device that may be connected to a network 120. In each case the motion sensor 110 may be connected to the network 120 in a wired or wireless manner.

Generally, the at least one motion sensor 110 operates in a conventional manner (i.e., determines occupancy/non-occupancy) and controls the associated lighting appropriately. That is, when occupancy is determined lighting within the corresponding area is activated and when non-occupancy is determined lighting within the corresponding are is deactivated. The at least one motion sensor 110 may further report the determined state either in accordance with an event (i.e., a change of state) or periodically.

In accordance with the principles of the invention, motion sensor 110 may report the state of motion or occupancy in a more granular manner. The more granular motion data may be transmitted immediately to the processor 140, via the network 120, or may be locally stored and then "batch" transmitted to the processor 140.

Once the more granular data is received, the more granular data may be processed by the processor 140 differently for lighting control purposes and for occupancy information. Thus, the data stream from motion sensor(s) 110 may be processed using two processing methodologies: one for granular motion information and other for lighting control, as will be further described.

In order to improve granularity of the determination of occupancy/non-occupancy, in accordance with the principles of the invention, each of the at least one motion sensors 110 may transmit an indication of motion data at a more rapid rate. For example, a one bit motion data bit (e.g., 1 for motion and 0 for no motion) may be transmitted at a known rate or interval (e.g., once per minute) to the processor 140.

In this case, the processor 140 may then accumulate the provided data to improve the determination of occupancy/non-occupancy. That is, using the example above, the processor would receive fifty-one 1-bit transmissions of which thirty, during the reset period, would be of a 0 value. As would be appreciated, conventional packet-switching networks transmit data in packets that include source and destination address information. Hence, the "1-bit" information transmission may require significantly more overhead bits.

Thus, while the processing unit 140 may provide the user with an improved granularity of the occupancy and/or non-occupancy of any area within a larger area (e.g., a building), the transmission of a 1-bit indicator presents significant burden on the network.

That is, while is useful in providing an improved level of granularity in determining occupancy and/or non-occupancy, the 1-bit transmission adds load on to the network as a single one bit transmission may require a packet size, for example, of 30 bytes, depending upon the transmission protocols. The load on the network is even higher when the system includes 10-1000 sensors.

In another aspect of the invention, the transmission of the occupancy information may take advantage of a delay-tolerant property of motion data and present a very compact way of conveying more granular occupancy information.

In this aspect of the invention rather than transmitting the occupancy data every predetermined time or whenever motion is detected, the occupancy/non-occupancy data may be stored locally, in a granular motion data block. The occupancy/non-occupancy data may be stored for a finite duration and then transmitted when the duration expires or periodically. The collected data may then be transmitted as a bit vector of motion sensing data.

In an exemplary aspect of the invention, a processor may be incorporated inside the motion sensor 110, which determines occupancy/un-occupancy based on motion sensing data. The determination of occupancy may then be provided to the processor 140, which then controls a lighting system based on the determined occupancy/un-occupancy of a covered area.

Referring to the example, above, motion sensor 110 may record motion information every 'x' minutes and have a reset time of 'y' minutes (wherein x⇐y). Further assuming that data will be transmitted every z minutes (z⇐y). Variables x, y, and z are free parameters and are selected based on a particular application.

Assume x=1 min and y=30 mins, z=16 mins.
Therefore the following sequence:
Motion for 5 mins;
no-motion for 15 mins;
motion for 1 min; and
no-motion for 30 mins
results in a z-bit element data vector (e.g. 16 bits) being transmitted to processor 140 to indicate the motion information of the first 16 mins as (excluding overhead bits):

| 1 | 1 | 1 | 1 | 1 | 0 | 0 | 0 | 0 | 0 | 0 | 0 | 0 | 0 | 0 | 0 |

And a second 16 bit data vector transmission would consist of:

| 0 | 0 | 0 | 0 | 1 | 0 | 0 | 0 | 0 | 0 | 0 | 0 | 0 | 0 | 0 | 0 |

Hence, in accordance with this aspect of the invention, motion sensor 110 transmits a vector of bits that conveys the motion/no-motion information in a compact format. For example, each vector may be transmitted over a public or private network, in a packet format at a desired time, using one or more well-known protocols (e.g., TCP/IP).

In addition, processor 140 may determine the isolated one minute motion indication (see second vector, slot 5) is a false indication and may, thus, determine the reset time has in fact expired. Hence, while the corresponding sensor 110 may reset the reset timer and begin the countdown timer, processor 140 may override the countdown time count to turn-off the corresponding lighting. In this case, the length of time the lighting in a corresponding area may be "on" for a period of 32 minutes as opposed to the 51 minutes, as shown above, as the false indication be detected and override the resetting of the sensor because of a false reading.

Figure 2:
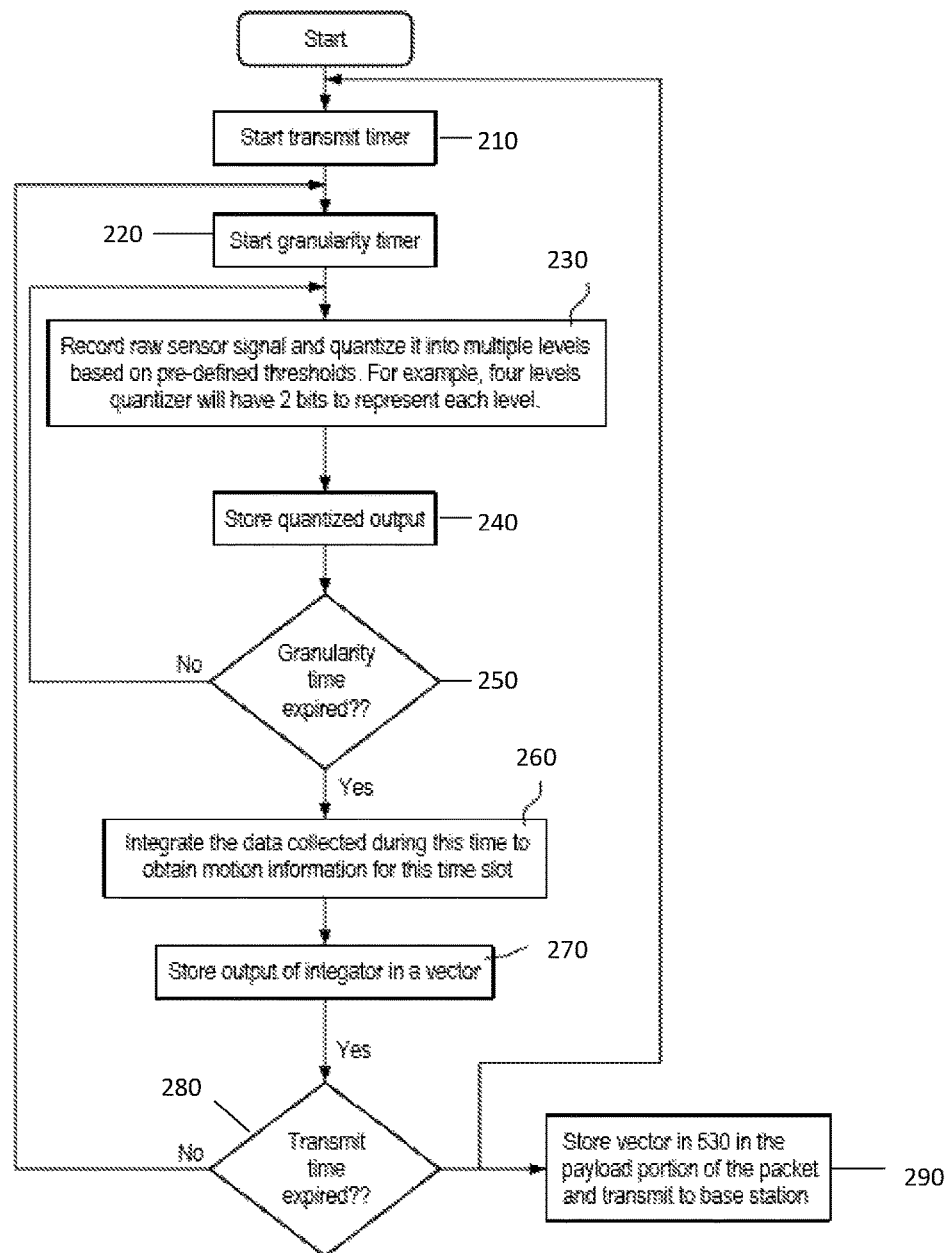
FIG. 2 illustrates a flow chart of an exemplary process in accordance with the principles of the invention.

FIG. 2 illustrates a flow chart of an exemplary processing in accordance with the principles of the invention.

Upon entry, a transmit timer is set at block 210. At block 220 a granularity timer is started. At block 230, the sensor data is collected and quantized in at least one level based on pre-defined threshold values. That is, the motion sensor 110 generates an analog signal in response to motion within its region of coverage. The analog signal may then be quantized into at least two levels based on pre-defined threshold levels. In a conventional motion sensor, a quantized output of no motion (i.e., value 0) may be determined if the analog signal is a zero-value, and an output of motion (i.e., value 1) may be determined if the analog signal is a non-zero value. In this case, the quantization level is of order 2. However, it would be appreciated, that the quantization level may be of a higher order, wherein three threshold levels are utilized and two bits (i.e., four levels) may be used to indicate the degree of motion. Similarly if three bits are used to indicate the degree of motion, then eight (8) levels of motion may be determined. In these higher levels to quantization, the threshold levels may be predetermined, selectable (by user, for example) or provided to the sensor 110 through the network 120. In addition, the vector output (shown above using a single bit for each state per unit time period) would include two (or three) bits for each state per unit time period, as will be explained.

At step 240, the determined quantization level of motion is stored. At block 250, a determination is made whether the granularity timer has expired. If not, then the analog motion data continues to be collected by sensor 110 at step 230.

Otherwise, the collected quantized motion data may be processed (e.g., integrated) to obtain the motion information for this time slot (i.e., granularity time period) at step 260.

That is, as the analog sensing data is continuously sampled and quantized, a plurality of samples are available for each granularity time period. The collected samples may be processed to determine a single output value for the associated granularity time period, as discussed above.

In one aspect of the invention, the collected samples may be subjected to an integration processing in order to determine a single value representative of the motion during the granularity time period. The processing may, for example, be one of an averaging of the collected values, removing isolated high values and low values and then averaging the remaining collected values (i.e., modified average), a weighted average of the collected values, a minimum value or a maximum value, etc.

The resultant integrated collected value may then be quantized into a single value that represents a status of motion within the corresponding granularity time period. For example, with a single level of quantization, the resultant value may be one of a 0 or a 1 to represent no motion and motion, respectively, as shown above.

With two levels of quantization, the resultant value may be one of 0, 1, 2, or 3, wherein 0 represents no motion and 3 represents full motion. Using the example above, a two level quantization may be represented as:

First vector for 16 minutes of motion sensing:

| 1 | 1 | 1 | 1 | 1 | 1 | 1 | 1 | 1 | 1 | 1 | 0 | 1 | 0 | 1 | 0 |
| 1 | 0 | 0 | 1 | 0 | 1 | 0 | 0 | 0 | 0 | 0 | 0 | 0 | 0 | 0 | 0 |

Second vector for second 16 minutes of motion sensing

| 0 | 0 | 0 | 0 | 0 | 0 | 0 | 0 | 1 | 1 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

In this exemplary case, two bits represent a level of motion within the granularity time period, where level 0 represents no motion and level 3 represents full motion.

Levels 1 (i.e., $01_2$) and 2 (i.e., $10_2$) may represent different levels of motion within the granularity time period. For example, if the continuously sampled motion data indicates full motion (e.g., greater than 75 percent of samples within the granularity timer period having quantization values of 11, then the resultant motion for the granularity period may be represented as 11. Similarly, if the continuously sampled motion data indicates some full motion samples (i.e., 11) and some non-motion (i.e., 00) and the number of full motion samples is in a range of 50 to 75 percent of the total number of samples, then the resultant motion for the corresponding granularity time period may be represented as partial motion (i.e., 10). Similar processing may be employed for partial motion of 01 and no motion 00, wherein a partial motion value of 01 may be determined if the number of full motion sample is in a range of 25 to 50 percent of the total number of samples.

Although the example presented above is provided to describe one method of representing motion from the collected samples obtained during a granularity period, it would be recognized that other methods of determining levels of motion within a granularity period may be formulated based on the description of the invention, herein, and such methods considered within the scope of the invention.

Similar output determination may be made for three bits of quantization where the levels may be represented as 0-7.

As would be appreciated, the transmit timer (i.e., z), the storage timer (i.e., x), and the reset timer (i.e., y), may be predetermined and fixed. In another aspect of the invention, the timer values may be variable and provided through network 120 by processor 140 to corresponding ones of the sensors 110 or may be inputted by a user directly at the motion sensor 110.

At block 270, the resultant output value for the granularity period is then stored in a transmit vector at a corresponding time slot. At block 280, a determination is made whether the transmit timer has expired. If not, then processing continues to step 220, where the granularity timer is started again to collect data for a next granularity time period.

Otherwise, processing continues to step 290 where the transmit vector is stored in a data packet and transmitted to the processor 140, as previously described.

In one aspect of the invention, processor 140 may determine the occupancy/non-occupancy of an area and determine the necessary lighting of the area (i.e., on/off) by integrating the received values over the transmitted period to determine whether received values are significantly directed toward occupancy (i.e., greater number of occupancy states than non-occupancy states) or directed toward non-occupancy (i.e., greater number of non-occupancy states than occupancy states). In another aspect of the invention, processor 140 may determine from the collected data that the reset time (i.e., z) is generally too long as a limited number of false occupancies have been determined. Hence, the reset time may be adjusted to be smaller so that the motion sensor 110 remains in the occupancy state for a shorter period of time when non-occupancy is determined. Similarly, the storage time may be adjusted to provide a further granularity of the occupancy/non-occupancy of an area.

Thus, in accordance with the principles of the invention, further savings in electrical costs may be obtained by adjusting a time period motion sensor 110 (i.e., the reset time period remains in the occupied state, even though the area is unoccupied). That is, the reset timer may be adjusted based on the provided data. For example, in the example above, wherein the reset timer of the motion sensor 110 is set at 30 minutes, in accordance with the principles of the invention, the reset set time may be adjusted or modified based on the provided granulated data.

In another exemplary embodiment of the invention, the motion sensors 110 may be configured to provide information regarding occupancy in an emergency situation.

In this aspect of the invention, the motion sensor 110 may receive information to adjust one the granularity timer and/or the transmit timer or the periodic timer so that occupancy information within an area is provided at a more frequent rate (i.e., shorter interval).

In this aspect of the invention, real-time motion detection (i.e., occupancy) information may be overlaid onto a floor plan that may be forwarded to emergency personal. The emergency personal may then be able to determine those areas that are not occupied (or have not been occupied for at least the reset time). The emergency personal may further be able to deduce whether the indication of non-occupancy is correct based on a history of motion within an area. For example, an indication of non-occupancy may be false if a person within the area is motionless and the reset timer has expired. In this case, a previous history of motion in the area, and in adjacent areas, may be used to determine whether the area is unoccupied or whether the area is occupied with a motionless person.

Figure 3:
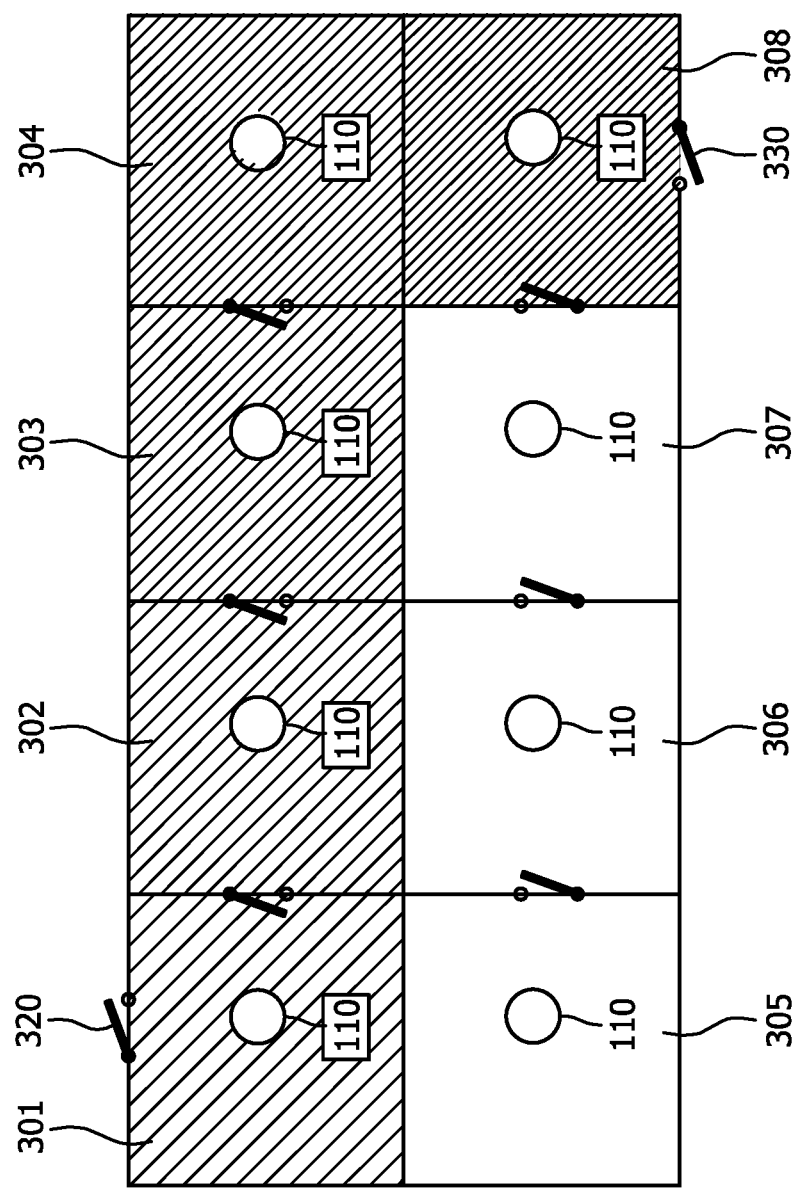
FIG. 3 illustrates an exemplary example of a system in accordance with the principles of the invention.

FIG. 3 illustrates an example of a system in accordance with the present invention, wherein a map provides helpful information regard occupancy in an emergency situation.

In this illustrated example, a typical deployment of occupancy or motion sensors in a rectangular space is illustrated, wherein each area labelled 301, 302, 303 . . . 308 includes an occupancy sensor 110 in a corresponding area. The detection area(s) of FIG. 3 are shown as rectangular but it would be appreciated that these areas may be of any shape (e.g., circular or a polygon) and size. For simplicity the boundaries of detection areas of neighboring sensors 110 are shown to touch each other. In practice, the detection areas of neighboring sensors may or may not overlap.

As discussed previously, the sensor 110 monitors the motion within a corresponding area with a desired level of granularity. The motion/non-motion data is provided to the processor 140, which may retain a memory of periods of occupancy/non-occupancy that may be used in determining a history of occupancy.

The areas shown in FIG. 3 are distinguished by the hashing which indicates a reset countdown timer value. Close hashing indicates that the countdown timer is reset to the reset timeout value. This happens when a motion is detected as shown in area 308. No hashing indicates that the corresponding countdown timer has reached the value of zero. This means that occupancy sensor did not detect motion for the timeout duration and, hence, the occupancy sensor has transition to unoccupied state. In this illustrated example, areas 305, 306, and 307 are areas that have been unoccupied for at least the reset timer duration. Other degrees of level of non-occupancy are indicated by different levels of hashing. In this illustrative embodiment, the hashing scale ranges from widest to closest with varying levels of spacing between hash lines to indicate different elapsed time values.

For example, assume that sensors 110 deployed in FIG. 3 have a timeout interval of 5 minutes and all of them are in unoccupied state. Further assume that at minute 0 a person enters the space 301 through door 1, 320, and is detected by the corresponding sensor 110. The person then walks through area 301 towards sensor 110 in area 302. After one minute the person enters the detection area of sensor 110 in area 302 and walks towards sensor 110 in area 303. After 2 minutes the person enters the detection area of sensor 110 in area 303 and walks towards sensor 110 in area 304. After 4 minutes the person enters the detection area of sensor 110 in area 308 and walks towards the door 2, 330. At the end of fifth minute the person reaches door 2, 330. Table 1 presents the timer values of the sensors and corresponding hashing.

As shown in Table 1 the reset time in area 301 is a value of 4 minutes, leaving one (1) minute left before timing out. Similarly, the reset time in area 304 is one (1) minute, leaving four (4) minutes left before timing out. The area 305 has no hashing as this area was not occupied by the person and the occupancy sensor has already timed out.

TABLE 1

| Area ID | Timer value | Color |
| --- | --- | --- |
| 301 | 4 | Widest hash -1 |
| 302 | 3 | Widest hash -2 |
| 303 | 2 | Widest hash -3 |
| 304 | 1 | Widest hash-4 |
| 305 | 5 | No hash |
| 306 | 5 | No hash |
| 307 | 5 | No hash |
| 308 | 0 | Closest hash |

Thus, according to FIG. 3, a history of a person's motion within multiple areas may be determined and plotted. For example, in this exemplary example, the motion vector for corresponding areas may be time offset from each other showing motion from one area to another. In this exemplary case, emergency personal may quickly determine a status of each of the areas within a floor-plan, based on a remaining time for the reset timer.

Although the floor-plan of FIG. 3 is illustrated in hashing, it would be recognized that other types of displays may be presented without altering the scope of the invention claimed. For example, the display may be color coded wherein a color is selected for each of the areas based on a remaining time-out time. For example, an unoccupied state may be colored white and a most recently occupied state (e.g., area 308) may be colored red. The various shades of color between white (unoccupied) and red (most recently occupied) may be used to determine different levels of previous occupation.

In another aspect of the invention, an analysis of the floor-plan movement may provide an indication of a motionless person within an area. For example, returning to FIG. 3, if area 308 is in unoccupied state (white) but area 305 is in a lighter shade of red, which indicates that motion had been detected in area 305 and then stopped as motion was not detected in area 308. Hence, the area 305 may be deduced as being occupied but no motion is being detected.

Hence, in this exemplary embodiment of the invention, emergency personal may direct their search to area 305. As would be appreciated, an intuitive color coded graphical visualization of the occupancy of an area may also be utilized to provide information regarding real-time motion sensing that may be used to assist emergency personal. For example, different shades of blue and red (i.e., dark blue, light blue, light red, dark red) may be used to distinguish areas that are; fully unoccupied (dark blue), have been recently indicated to be unoccupied (light blue), have more recently been indicated to be unoccupied (light red), and occupied (red).

In another aspect of the invention, the behavior of occupancy sensors, i.e., granularity, reporting times, reset time, etc., may be modified, for example, during emergency situations to report more timely and refined motion sending data. In this aspect of the invention, the granularity time and reporting time may be provided to the motion sensor 110 over a network 120 (wired or wireless) (FIG. 1, el. 120). In addition, the level of quantization may be altered and provided over the network to provide a further level of granularity.

Figure 4:
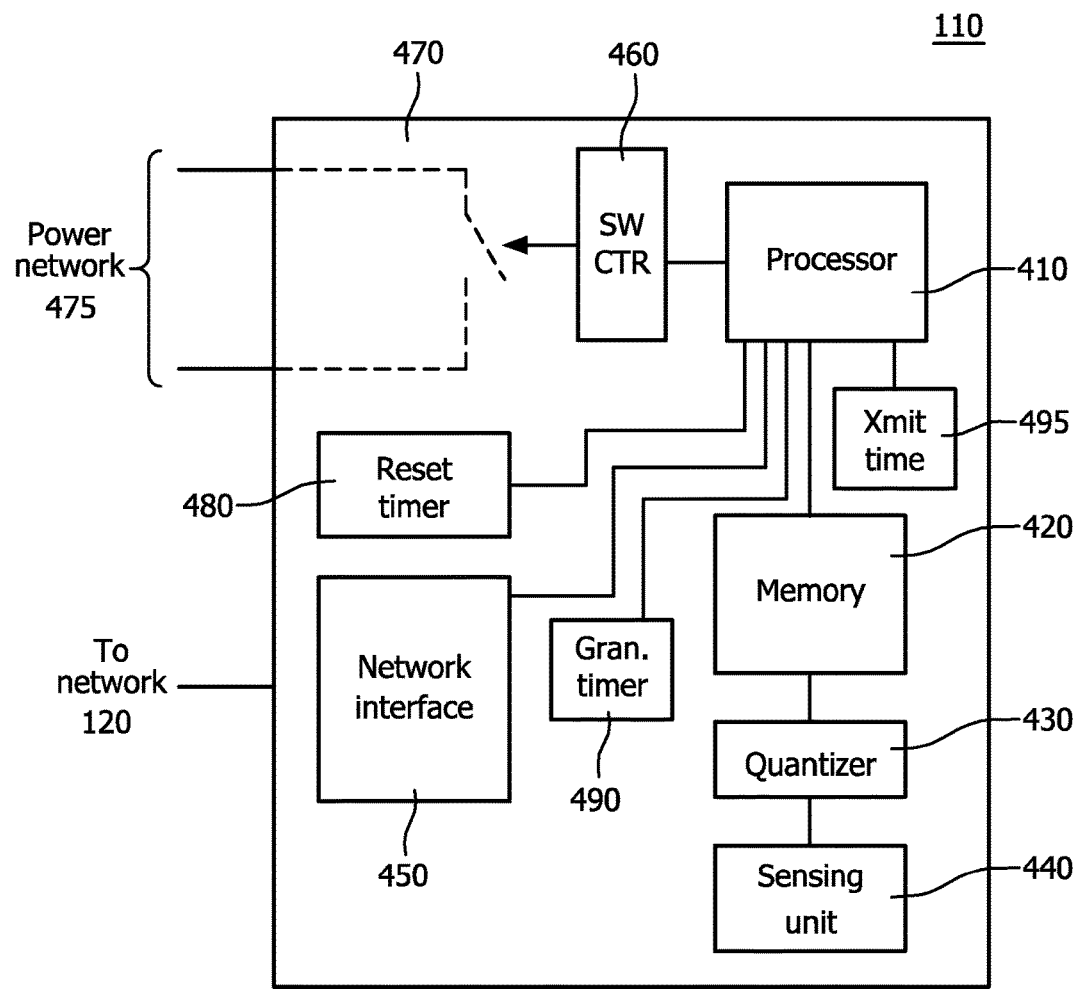
FIG. 4 illustrates an exemplary motion sensor in accordance with the principles of the invention.

FIG. 4 illustrates an exemplary motion sensor 110 in accordance with the principles of the invention.

FIG. 4 illustrates sensor 110 including a processor 410, a memory 420, a quantizer 430 and a sensing unit 440. The sensing unit 440, as previously discussed, provides an analog signal that is representative of motion within an area. The sensing unit 440 may be IR or ultrasound, for example.

The analog signal is then quantized as previously discussed by quantizer (e.g., Analog to Digital converter) 430. The quantized results are stored in memory 420 and are accessed by processor 410.

Also illustrated are reset timer 480 and granularity timer 490 that provide processor 410 with countdown time values. The reset time 480 may represent a time value that resets the determination of motion (or occupancy) as previously discussed. The granularity timer may provide a countdown timer for the collection of data from sensing unit 440, as previously discussed. Transmit timer 495 may represent a countdown timer that is used to determine when the collected data is to be transmitted.

In addition, sensor 110 includes a network interface 450 (such as a transmitter) that provides the stored information to a network 120 (not shown). Network 120 may further provide information (e.g., timer values) to the processor that may be used in subsequent processing. The provided time values may override or supplemental the times provided by the illustrated timers.

Also shown is a switch control module 460 that provides an interface to a switch 470 that interrupts a power network 475, which is connected through motion sensor 110. The power network 475 provides electrical energy to associated lighting elements or module (not shown).

In this illustrated case, processor 410 may provide commands to control module 460 to close switch 470 to allow electrical energy to pass to a connected lighting module (not shown). Similarly, processor 410 may determine, from the collected data that the covered area has no motion for the duration of the reset time and provide commands to the control module 460 to disconnect the lighting module from the electrical energy provided by the power network 475.

As would be appreciated, processor 410 may receive information from processor 140 to turn on/off an associated lighting module. That is, as discussed previously, electrical energy, provided through sensor 110 and, directed to an associated lighting module may be continued or interrupted based on the determination of motion (i.e., occupancy) within a covered area by the sensor 110 or by commands provided by processor 140.

Although timers 480, 490 and 495 are shown as discrete elements, it would be appreciated that timers 480, 490 and 495 may be timers that are internal variable values determined by processor 410 or provided by processor 140.

In one aspect of the invention, occupancy/non-occupancy may be determined at the end of the second time period (i.e., transmission period), by processor 410 or processor 140 by integrating the collected values in each of the first time periods (i.e., granularity period). By integrating the collected values, the processor (140, 410) may remove isolated (i.e., false positive values), and, hence, prevent the reset time from being re-initialized based on a single false positive indication of motion.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Furthermore, a computer, a processor and/or dedicated hardware/software are described herein as being capable of performing the processing described herein, and it would be recognized that a computer, a processor and/or dedicated hardware/software are well-known elements in the art of signal processing and, thus, a detailed description of the elements of the processor need not provided in order for one skilled in the art to practice the invention described, herein.

The invention has been described with reference to specific embodiments. One of ordinary skill in the art, however, appreciates that various modifications and changes can be made without departing from the scope of the invention as set forth in the claims. Accordingly, the specification is to be regarded in an illustrative manner, rather than with a restrictive view, and all such modifications are intended to be included within the scope of the invention.

Benefits, other advantages, and solutions to problems have been described above with regard to specific embodiments. The benefits, advantages, and solutions to problems, and any element(s) that may cause any benefits, advantages, or solutions to occur or become more pronounced, are not to be construed as a critical, required, or an essential feature or element of any or all of the claims.

As used herein, the terms "comprises", "comprising", "includes", "including", "has", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "of" refers to an inclusive "or" and not to an exclusive "or". For example, a condition A or B is satisfied by any one of the following: A is true (or present) and B is false (or not present); A is false (or not present) and B is true (or present); and both A and B are true (or present).

The terms "a" or "an" as used herein are to describe elements and components of the invention. This is done for convenience to the reader and to provide a general sense of the invention. The use of these terms in the description herein should be read and understood to include one or at least one. In addition, the singular also includes the plural unless indicated to the contrary. For example, reference to a composition containing "a compound" includes one or more compounds. As used in this specification and the appended claims, the term "or" is generally employed in its sense including "and/or" unless the content clearly dictates otherwise.

All numeric values are herein assumed to be modified by the term "about," whether or not explicitly indicated. The term "about" generally refers to a range of numbers that one of skill in the art would consider equivalent to the recited value (i.e., having the same function or result). In said stored quantized samples any instances, the terms "about" may include numbers that are rounded (or lowered) to the nearest significant figure.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A motion sensor comprising:
a motion sensing element;
a storage unit storing a plurality of respective sensor values sampled with a first/granularity time period from said motion sensing element;
a quantization element producing quantized values of said plurality of sensor values; and
a processing unit:
determining a representative value of said collected stored quantized values; and
storing said representative value of said collected stored quantized values, said representative value of said collected stored quantized values being stored for a second/transmit time period, wherein the second/transmit time period is greater than the first/granularity time period.

2. The sensor of claim 1, further comprising:
a transmitter; and
the processor transmitting the stored representative values at an end of said second/transmit time period.

3. The sensor of claim 1, wherein said representative value of said collected stored quantized values being determined by integrating said collected stored quantized values.

4. The sensor of claim 3, wherein said integrating of said collected stored quantized values is one of: an averaging, a weighted averaging, a modified averaging, a minimum value, and a maximum value of said collected stored quantized values.

5. The sensor of claim 2, wherein said representative value of said collected stored quantized values are transmitted as a vector.

6. A system for determining occupancy in a plurality of areas, said system comprising:
a plurality of sensors, at least one sensor in each of said plurality of areas, the system comprising:
each sensor including a memory storing sensor values sampled during a plurality of first/granularity time periods and a processor enabled to determine a level of motion using the sensor values in a corresponding area for each of the first/granularity time periods and transmitting said level of motion in each of said plurality of first/granularity time periods at a conclusion of a second transmit time period;
a system processor enabled to determine occupancy in each of said areas based on said received level of motion; and
wherein said level of motion in each of said plurality of first/granularity time periods is determined as an integration of at least one sample collected during a corresponding first/granularity time period.

7. The system of claim 6, wherein said integration is one of: an averaging, a weighted averaging, a modified averaging, a maximum, and a minimum of said at least one sample collected during said corresponding first time period.

8. The system of claim 6, wherein at least one of said first time period, said second time period and a level of motion is provided to a corresponding one of said plurality of sensors.

9. A method for improving a determination of occupancy of an area having a plurality of sensors, said method comprising:
receiving sensor values from the plurality of sensors with a first time period;
quantizing each of said sensor values;
storing each of said quantized sensor values;
integrating said stored quantized sensor values; and
storing each of said integrated quantized sensor values for a second period of time; and
determining an occupancy of an area based on the stored integrated quantized sensor values at an end of said second period of time.

10. The method of claim 9, wherein said integrating said stored quantized sensor values comprises one of: an averaging, a weighted averaging, a modified averaging, a minimum value, and a maximum value of said stored quantized sensor values.

11. The method of claim 9, wherein said first time period and said second time period are one of: predetermined, selectable and dynamically alterable.

* * * * *